United States Patent
Takahashi

(10) Patent No.: US 8,503,728 B2
(45) Date of Patent: Aug. 6, 2013

(54) ROAD MARKING IMAGE PROCESSING DEVICE, ROAD MARKING IMAGE PROCESSING METHOD, AND PROGRAM

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 539 days.

(21) Appl. No.: 12/738,006

(22) PCT Filed: Oct. 1, 2008

(86) PCT No.: PCT/JP2008/067829
§ 371 (c)(1),
(2), (4) Date: Apr. 14, 2010

(87) PCT Pub. No.: WO2009/057410
PCT Pub. Date: May 7, 2009

(65) Prior Publication Data
US 2010/0215218 A1 Aug. 26, 2010

(30) Foreign Application Priority Data
Oct. 30, 2007 (JP) .................... 2007-281770

(51) Int. Cl.
*G06K 9/00* (2006.01)
(52) U.S. Cl.
USPC ........................ 382/104; 382/107
(58) Field of Classification Search
USPC ... 382/104, 107, 276, 284; 348/148; 701/300, 701/301; 340/435, 436, 437
See application file for complete search history.

(56) References Cited

U.S. PATENT DOCUMENTS

| | | | |
|---|---|---|---|
| 2003/0165255 A1* | 9/2003 | Yanagawa et al. | 382/104 |
| 2007/0239357 A1* | 10/2007 | Mori et al. | 701/213 |
| 2007/0273554 A1* | 11/2007 | Sakakibara | 340/932.2 |

FOREIGN PATENT DOCUMENTS

| | | |
|---|---|---|
| JP | 2002087160 A | 3/2002 |
| JP | 2003259359 A | 9/2003 |
| JP | 3521859 B2 | 2/2004 |
| JP | 2005301517 A | 10/2005 |
| JP | 3847547 B2 | 9/2006 |
| JP | 2007096497 A | 4/2007 |
| JP | 2007228448 A | 9/2007 |
| JP | 2008-210084 A | 9/2008 |

OTHER PUBLICATIONS

Japanese Office Action for JP2009-538983 mailed on May 8, 2012.
Japanese Office Action for JP2009-538983 issued Dec. 27, 2011.
International Search Report for PCT/JP2008/067829 mailed Nov. 18, 2008.

* cited by examiner

*Primary Examiner* — Andrew W Johns

(57) ABSTRACT

To provide a road marking image processing device which performs highly accurate road marking recognition by creating a high-quality synthesized bird's-eye image that has no influence from the camera parameter error and noise such as the reflection light from the road surface, lens extraneous matter, shadow of the own vehicle, and the like. A new synthesized range identifying module creates a bird's-eye image of only an area not contained in a synthesized bird's-eye image created based on the road images up to the one captured previously from the current road image. An image synthesizing module synthesizes the bird's-eye image and the synthesized bird's-eye image created based on the road images up to the one captured previously to create a new synthesized bird's-eye image.

14 Claims, 18 Drawing Sheets

FIG.17A
FIG.17B
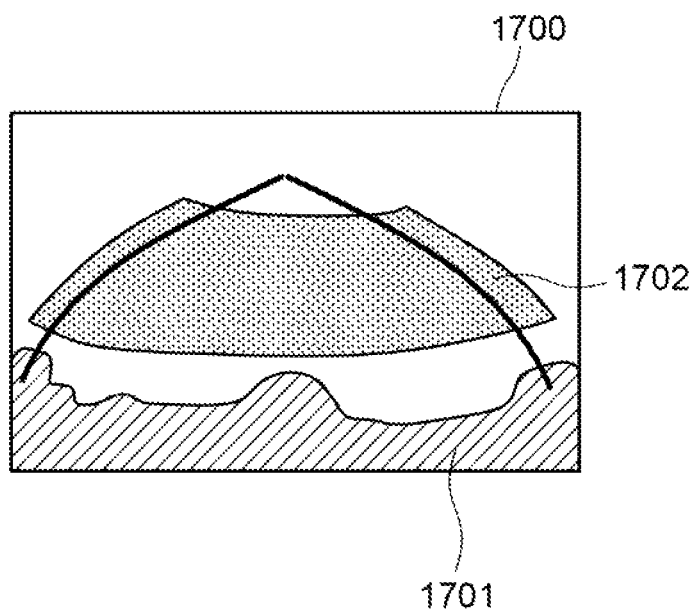
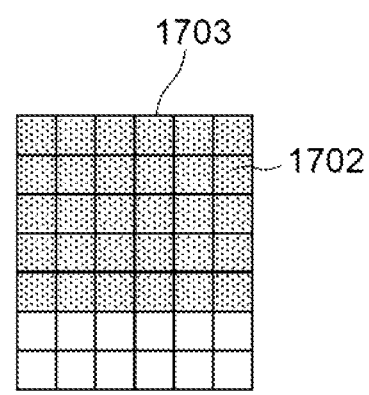

FIG.18

| ANGLE FROM CAMERA OPTICAL AXIS | CAMERA ATTACHING ANGLE | | |
|---|---|---|---|
| | 30 DEGREES | 31 DEGREES | 33 DEGREES |
| -30 | 0.00(m) | 0.01 | 0.04 |
| -25 | 0.07 | 0.08 | 0.11 |
| -20 | 0.14 | 0.16 | 0.18 |
| -15 | 0.21 | 0.23 | 0.26 |
| -10 | 0.29 | 0.31 | 0.34 |
| -5 | 0.37 | 0.39 | 0.43 |
| 0 | 0.46 | 0.48 | 0.52 |
| 5 | 0.56 | 0.58 | 0.62 |
| 10 | 0.67 | 0.69 | 0.75 |
| 15 | 0.80 | 0.83 | 0.89 |
| 20 | 0.95 | 0.99 | 1.06 |
| 25 | 1.14 | 1.18 | 1.28 |
| 30 | 1.38 | 1.44 | 1.57 |
| 35 | 1.71 | 1.79 | 1.98 |
| 40 | 2.19 | 2.32 | 2.61 |
| 45 | 2.98 | 3.20 | 3.75 |
| 50 | 4.52 | 5.03 | 6.48 |
| 55 | 9.07 | 11.32 | 22.41 | though # US 8,503,728 B2

ROAD MARKING IMAGE PROCESSING DEVICE, ROAD MARKING IMAGE PROCESSING METHOD, AND PROGRAM

This Application is the National Phase of PCT/JP2008/067829, filed Oct. 1, 2008, which claims the Priority right based on Japanese Patent Application No. 2007-281770 filed on Oct. 30, 2007 and the disclosure thereof is hereby incorporated by reference in its entirety.

BACKGROUND OF THE INVENTION

1. Technical Field

The present invention relates to a road marking image processing device, a road marking image processing method and a program thereof, which acquires an image of a road surface by using a camera loaded on a vehicle and recognizes a road marking within the image. More specifically, the present invention relates to a road marking image processing device, a road marking image processing method and a program thereof, which performs image processing by converting an image picked up by a camera into a bird's-eye image.

2. Related Art

As a safety measure for automobiles, there is known a technique which supports driving of an automobile based on an image of areas in the vicinity of the vehicle picked up by an onboard camera. For example, there is a system which specifies the position of a vehicle, e.g., precisely specifies the traffic lane where the vehicle is traveling, by capturing an image of a traveling road surface of the vehicle by using the onboard camera and recognizing a road marking drawn on the road surface from the captured image.

As a technique for processing an image captured by an onboard camera, Patent Document 1 discloses a device which converts an input image from an onboard camera into a bird's-eye image, and creates a wide-range bird's-eye image by synthesizing the bird's-eye images acquired in order. The device disclosed in Patent Document 1 sets a conversion boundary line for the image from the onboard camera, which is a captured image of the traveling path ahead the vehicle, converts the section closer to the own car than the conversion boundary line into a bird's-eye image, synthesizes n-pieces of the bird's-eye images, and displays the synthesized bird's-eye image.

Further, as other related techniques, there are also techniques disclosed in Patent Document 2 and Patent Document 3. The technique disclosed in Patent Document 2 is a technique which detects a shift between a first bird's-eye image and a second bird's-eye image capture by an imaging module, adds an image of the shift part to the second bird's-eye image, and displays an image containing a region out of the current visual field of the imaging module. The technique disclosed in Patent Document 3 is a system which converts an image captured by a single onboard camera into a bird's-eye image, and creates and displays a peripheral image of a vehicle by connecting the acquired bird's-eye images according to chronological changes.

Patent Document 1: Japanese Patent Publication No. 3847547
Patent Document 2: Japanese Patent Publication No. 3521859
Patent Document 3: Japanese Unexamined Patent Publication 2007-96497

However, the techniques disclosed in Patent Documents 1-3 are designed on assumption that a highly precise camera parameter can be acquired. Thus, when it is tried to acquire a synthesized bird's-eye image by converting and synthesizing the images acquired through capturing images of a road surface moment by moment with a camera loaded on a vehicle, it is difficult to acquire a fine synthesized bird's-eye image since there is actually an influence of a camera parameter error when converting the captured images to the bird's-eye images. Further, it is also difficult to acquire a fine synthesized bird's-eye image due to an influence of noises, when noises caused by reflection of light of other vehicles from the road surface, extraneous matters attached to the camera lens, and a shadow of own vehicle and the like are captured into the image.

For example, regarding the camera parameter, the shift and distortion on the bird's-eye images become more extensive as the distance from the camera becomes farther if the accuracy of the attaching angle is insufficiently secured when attaching the onboard camera to the vehicle. This will be described by referring to the drawings.

FIG. 6 is an illustration for describing a placing state of a camera 602 that is placed on a rear part of a vehicle 601. It is assumed that the height from a ground to the camera 602 is h, and the angle between the optical axis of the camera 602 and the vertical direction is θ. FIG. 18 is a table showing the relationship between the angle from the camera optical axis and the horizontal distance from the point on the ground in that angle direction to the camera 602 when the attaching angle of the camera is set in three kinds under a camera setting environment as shown in FIG. 6. Here, it is assumed that the camera 602 has no lens distortion for simplifying the explanation, and illustrated are the cases where the height h from the ground to the camera 602 is 80 cm and the angle θ between the optical axis of the camera 602 and the vertical direction is set in three kinds such as 30 degrees, 31 degrees, and 33 degrees.

As shown in FIG. 18, when the angle θ supposed in the specification is 30 degrees but the camera 602 is actually attached at the angle θ of 31 degrees or 33 degrees, for example, it can be seen that the error in the horizontal distance between the point on the ground in the 0-degree angle direction from the optical axis of the camera 602 and the camera 602 is about several cm such as 0.02 m (=0.48 m−0.46 m) and 0.06 m (=0.52 m−0.46 m), respectively. In the meantime, it can be seen that the error of a case where the angle from the optical axis of the camera is 50 degrees is increased to 0.51 m (=5.03 m−4.52 m) and 1.96 m (=6.48 m−4.52 m).

The influence by the error imposed upon the input image will be described by referring to FIG. 2. FIG. 2 is an illustration showing bird's-eye images 203, 204 created from images captured at continuous time series in a case where the actual camera attaching angle .theta. is shifted from the assumed angle by several degrees and a synthesized bird's-eye image 205 of those. For the bird's-eye images 203 and 204, the distance between white lines 201 becomes wider as the distance from the camera becomes farther, and diamond-like paint 202 that is a road marking indicating presence of a pedestrian crossing becomes extended in the longitudinal direction as the distance from the camera becomes farther.

When the captured image is converted into the bird's-eye image, it is converted on assumption that the camera attaching angle .theta. is the assumed angle. Thus, when the camera attaching angle .theta. is shifted by several degrees, distortion and position shift are generated in the converted bird's-eye image. The influence of the distortion and position shift becomes more extensive on the ground in the direction with larger angles with respect to the camera optical axis, i.e., in the positions farther from the own vehicle, so that the ways of distortions in the diamond-like paint 202 of the bird's-eye image 203 and the diamond-like paint 202 of the bird's-eye image 204 that is acquired when the own vehicle makes a move slightly therefore become different. Therefore, when the bird's-eye images 203 and 204 are simply superimposed on one another, obtained is an image in which positions of the diamond-like paints 202 and the white lines 201 do not match with each other as in the case of the synthesized bird's-eye image 205.

The technique disclosed in Patent Document 1 sets the conversion boundary line, and synthesizes only the section closer to the camera than to the conversion boundary line within the bird's-eye image to create the synthesized bird's-eye image. However, since the conversion boundary line setting method is not clearly defined, the visibility of the synthesized bird's-eye image becomes deteriorated by being influenced by the position shift and the distortion between the bird's-eye images when there is a camera parameter error.

Further, for the reflection of headlight of a following vehicle and the reflection of the streetlight reflected from the road surface, as shown in FIG. 3, there is often observed a road-surface reflection region 301 of the headlight of a following vehicle 302 in an area that is about 1 m from the own vehicle 303 in a captured image 300 that is taken at night. In such case, the road surface display on the bird's-eye image is hidden by the road-surface reflection of the headlight, so that the synthesized bird's-eye image comes to contain the influence of the road-surface reflection.

Further, for the lens extraneous matters such as raindrops and mud, as shown in FIG. 4, when a raindrop is attached to the lens bottom section, the bird's-eye image comes to contain the influence of a section 403 where a region 401 containing an image of the raindrop and a region 402 to be converted into a bird's-eye image overlap with each other within an image 400. Thus, a synthesized bird's-eye image containing the image of the raindrop is to be generated. In the case where there is mud attached within a range of the image to be converted into a bird's-eye image, a synthesized bird's-eye image containing the image of mud is to be generated as well.

Furthermore, for the shadow of the own vehicle, as shown in FIG. 5, the shadow of the own vehicle is observed as a low-brightness region 502 at an upper section of a bumper 501 of the own vehicle that is on a bottom section of a captured image 500. When this region 502 is converted into a bird's-eye image, the shadow of the own vehicle is captured within the bird's-eye image, thereby generating a synthesized bird's-eye image in which the shade and sunny sections are mixed.

When there is generated the synthesized bird's-eye image containing the distortion and noise due to the error of the camera parameter, misdetection and detection error may be caused when detecting a road marking on the road surface from such synthesized bird's-eye image.

It is therefore an object of the present invention to improve the issues of the conventional techniques described above and to provide a road marking image processing device which performs highly accurate road marking recognition by creating a high-quality synthesized bird's-eye image that has no influence of the distortion and position shift in the bird's-eye image caused by the camera parameter error and no influence of the reflection light from the road surface, lens extraneous matter, shadow of the own vehicle, and the like captured into the image.

SUMMARY OF THE INVENTION

In order to achieve the foregoing object, the road marking image processing device according to the present invention includes: an imaging module which is loaded on a vehicle and captures a road image of a rear side of a traveling path; a movement amount measuring module which measures a movement amount of the vehicle; a new synthesized range identifying module which identifies a new synthesized range that is a newly acquired range among a road surface range contained in the road image based on the movement amount; a bird's-eye image creating module which creates a bird's-eye image of the new synthesized range based on the road image; an image storage module which stores the bird's-eye image created by the bird's-eye image creating module; and an image synthesizing module which creates a synthesized bird's-eye image by connecting, in a captured order, the bird's-eye images created in accordance with image capturing actions done by the imaging module, and transmits the created synthesized bird's-eye image to the image storage module.

Further, the road marking image processing method according to the present invention includes: an image capturing step which captures a road image of a rear side of a traveling path from a vehicle; a movement amount measuring step which measures a movement amount of the vehicle; a new synthesized range identifying step which identifies a new synthesized range that is a newly acquired range among a road surface range contained in the road image based on the movement amount; a bird's-eye image creating step which creates a bird's-eye image of the new synthesized range based on the road image; an image storing step which stores the bird's-eye image to an image storage module; and an image synthesizing step which creates a synthesized bird's-eye image by connecting, in a captured order, the bird's-eye images created in accordance with image capturing actions done by the imaging module, and transmits the created synthesized bird's-eye image to the image storage module.

Furthermore, the road marking image processing program according to the present invention causes a computer to execute: an image acquiring function which acquires a road image from an imaging module that captures the road image of a rear side of a traveling path from a vehicle; a vehicle movement amount acquiring function which acquires a movement amount value of the vehicle; a new synthesized range identifying function which identifies a new synthesized range that is a newly acquired range among a road surface range contained in the road image based on the movement amount; a bird's-eye image creating function which creates a bird's-eye image of the new synthesized range based on the road image; an image storing function which stores the bird's-eye image to a memory; and an image synthesizing function which creates a synthesized bird's-eye image by connecting, in a captured order, the bird's-eye images created in accordance with image capturing actions done by the imaging module, and transmits the created synthesized bird's-eye image to the memory.

With the present invention, the new synthesized range that is a newly acquired range among the road surface range contained in the captured road surface image becomes a range that is closer to the own vehicle. Thus, when converting to the bird's-eye image, the range is hardly affected by the influences of the error of the camera parameter and the reflection light of the headlight of the following vehicle reflected from the road surface. This makes it possible to acquire a fine-quality synthesized bird's-eye image through creating and connecting the bird's-eye images of the new synthesized ranges in order.

BRIEF DESCRIPTION OF THE DRAWINGS

FIGS. 17A and 17B shows illustrations for describing a case where a new synthesized range is identified from a closed region that is set in regions where raindrops are hardly captured at the time of startup on a rainy day.

FIG. 18 is a table showing angles from a camera optical axis direction formed due to shift in the attaching angle of an onboard camera and differences in the distance to points on a road surface observed in the respective directions.

DESCRIPTION OF THE INVENTION

Figure 1:
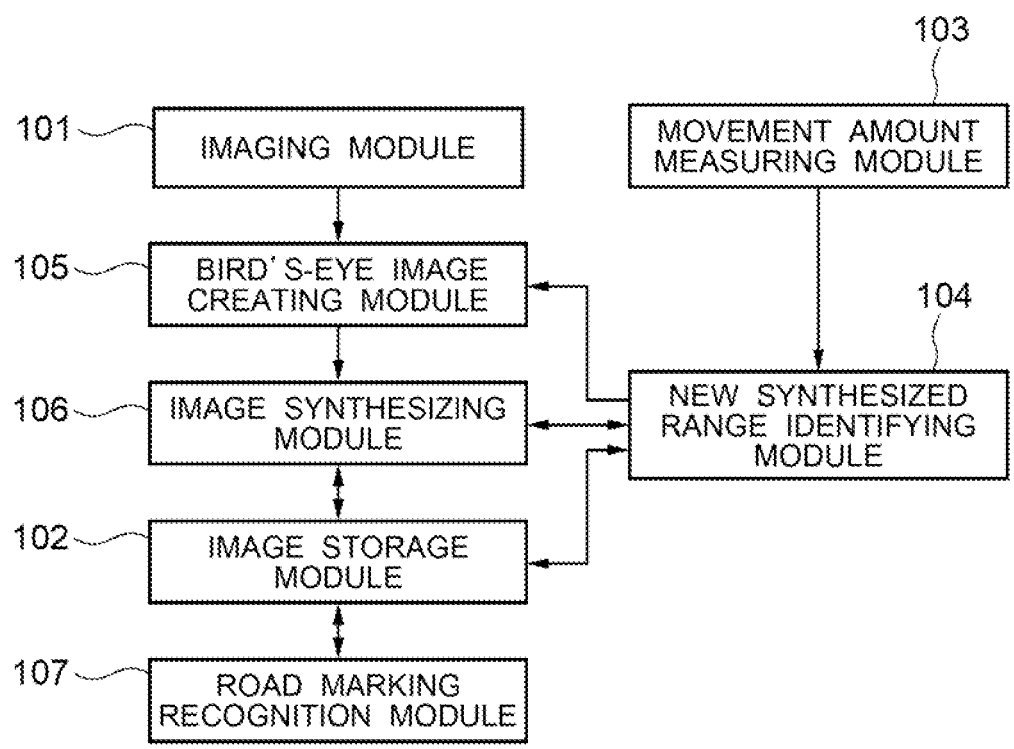
FIG. 1 is a block diagram showing the structure of a road marking image processing device of a first exemplary embodiment according to the invention.
Figure 2:
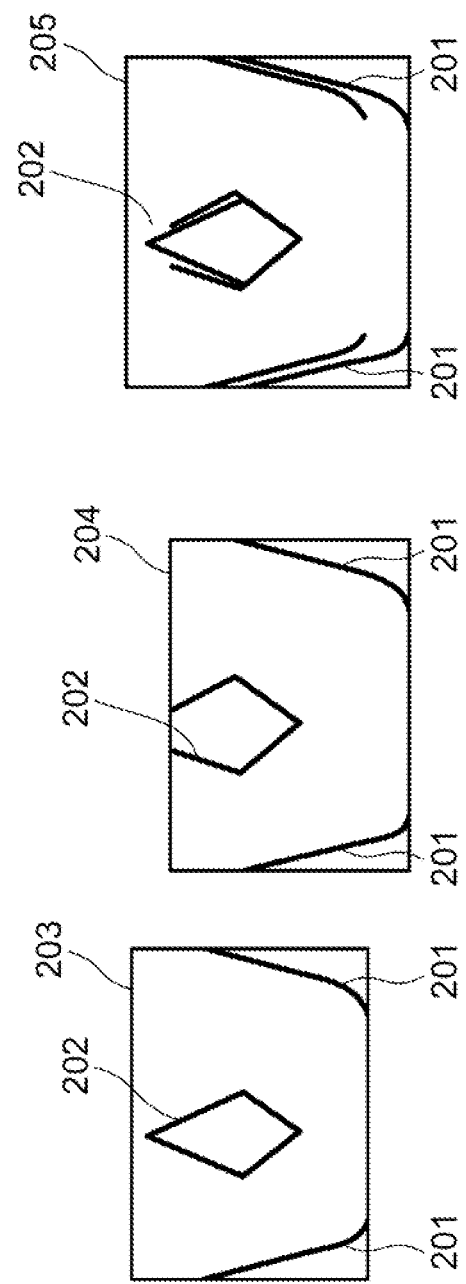
FIG. 2 is an illustration showing a synthesized bird's-eye image creating method of a conventional technique.
Figure 3:
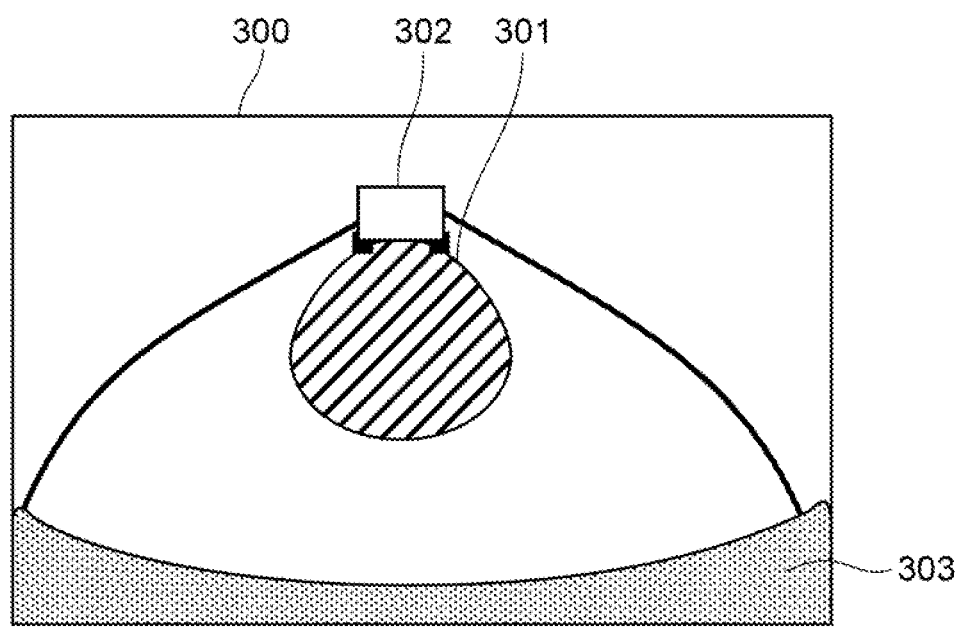
FIG. 3 is an illustration showing an example of a road image with a road surface reflection of headlight of a following car.

Hereinafter, an exemplary embodiment of the invention will be described by referring to the drawings.

First Exemplary Embodiment

First, a first exemplary embodiment of the invention will be described. FIG. 1 is a block diagram showing the structure of a road marking image processing device of the first exemplary embodiment.

As shown in FIG. 1, the road marking image processing device of the first exemplary embodiment includes: an imaging module 101 which is loaded on a vehicle and captures a road image in the rear side of the traveling path; a bird's-eye image creating module 105 which converts the road surface image acquired by the imaging module 101 into a bird's-eye image that is an image showing the ground from a viewpoint from the skies; an image storage module 102 which stores the created bird's-eye image; an image synthesizing module 106 which creates a synthesized bird's-eye image showing a wide-range road region by synthesizing the bird's-eye images created in order; and a road marking recognition module 107 which recognizes a road marking from the synthesized bird's-eye image.

The road marking image processing device of the first exemplary embodiment further includes: a movement amount measuring module 103 which measures the movement amount of the vehicle; and a new synthesized range identifying module 104 which identifies a new synthesized range that is a newly acquired range among the road surface range contained in the road image from the imaging module 101 based on the movement amount. The above-described bird's-eye image creating module 105 creates a bird's-eye image of the new synthesized range based on the road image from the imaging module 101, and the image synthesizing module 106 connects the bird's-eye images created by the bird's-eye image creating module 105 in the captured order in accordance with the image capturing done by the imaging module 101 and transmits the synthesized bird's-eye image to the image storage module 102.

Figure 6:
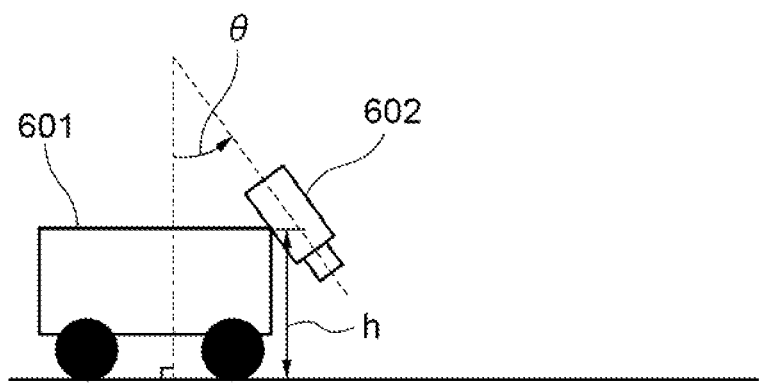
FIG. 6 is an illustration for describing a state of placing an onboard camera.
Figure 7:
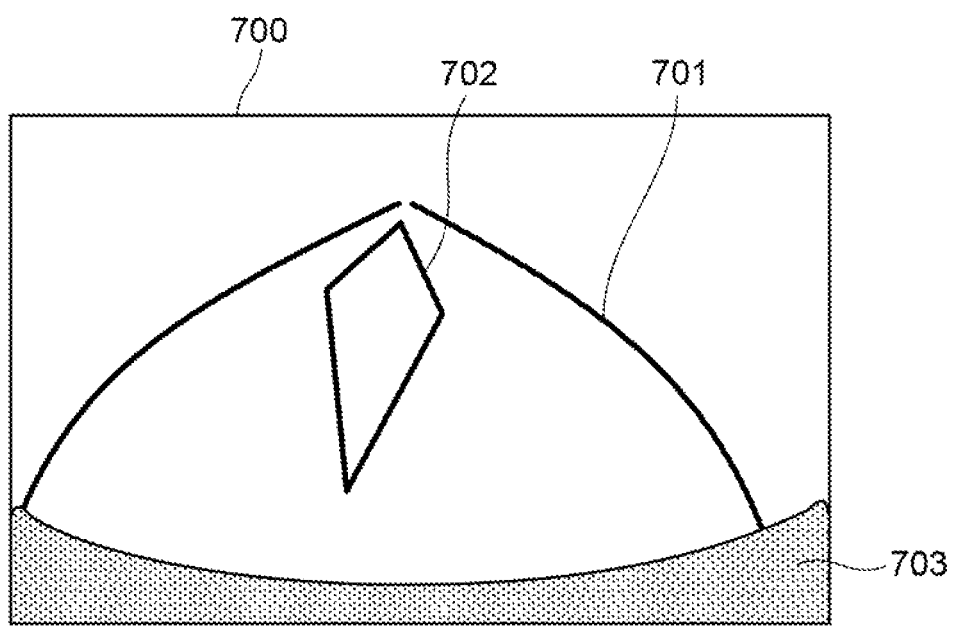
FIG. 7 is an illustration showing an example of how a road surface display in an input image is seen.

The imaging module 101 acquires the road images as the images of the road surface from moment to moment, and outputs the acquired road images to the bird's-eye image treating module 102. FIG. 7 shows an example of the image outputted from the imaging module 101. The imaging module 101 of the first exemplary embodiment is an onboard camera which captures images by using a wide-angle lens, and it is placed with its lens facing downwards in the oblique direction at the rear section of the vehicle as in the case of the camera 602 shown in FIG. 6. Thus, as shown in FIG. 7, in an image 700 that is obtained from the imaging module 101, there are distortions generated in white lines 701 and a road marking 702 of the road surface, and a bumper 703 of the own vehicle is captured in the bottom section of the image.

The image storage module 102 stores the synthesized bird's-eye image that is obtained by connecting the bird's-eye images converted from the road images acquired by the imaging module 101 from moment to moment. The size of the synthesized bird's-eye image may be extended every time the images are synthesized. Alternatively, it is also possible to store only a specific range closer to the imaging module 101 at all times. Specifically, it is designed to store the image showing the road surface region of only a specific range that is set as a range covering an area of 10 m in the rear direction from a reference point (the position of the vehicle, i.e., the position of the imaging module 101) for the depth direction and an area of 2 m in the left and right directions with respect to the reference point for the lateral direction, for example.

The movement amount measuring module 103 is formed with a car-speed sensor and the like, and outputs the movement amount that is the traveled amount of the vehicle from the amount of the vehicle movement traveled from the previous image capturing time to the current image capturing time of the imaging module 101 or from the road surface range of the synthesized bird's-eye image already stored in the image storage module 102.

Figure 9:
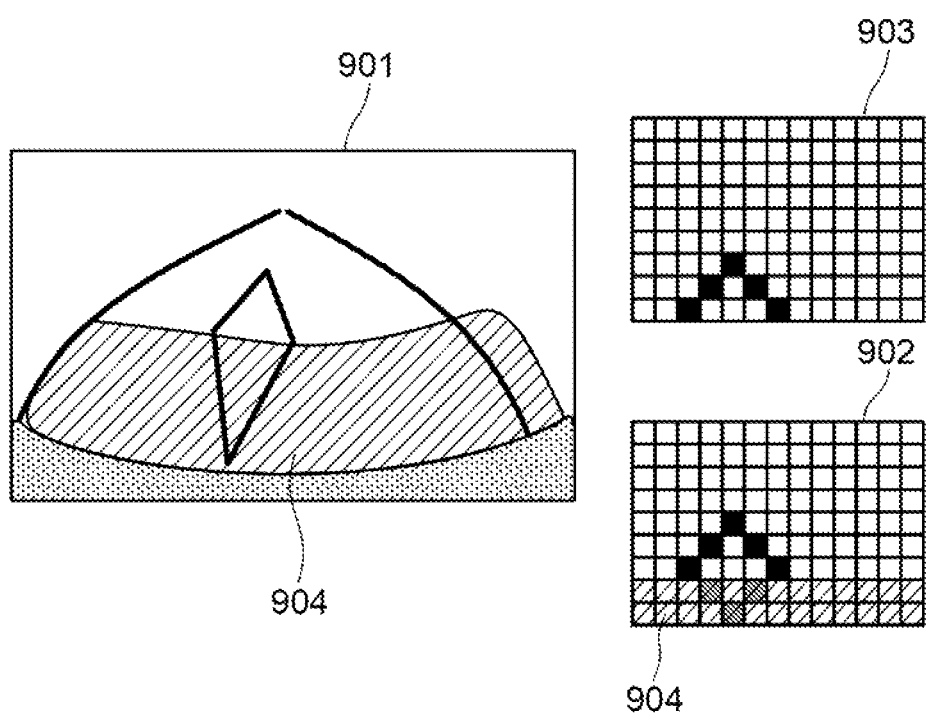
FIG. 9 is an illustration showing an example of a new synthesized range according to the exemplary embodiment disclosed in FIG. 1.

The new synthesized range identifying module 104 identifies the new synthesized range based on the movement amount of the vehicle and the contents of the synthesized bird's-eye image. As shown in FIG. 9, because the vehicle travel forwards for the movement amount measured by the movement amount measuring module 103, a road surface range 904 which is contained in a road image 901 captured at the current time or in a virtual bird's-eye image 902 corresponding to the road image 901 but not contained in a synthesized bird's-eye image 903 that is created based on the road images up to the one captured previously and stored in the image storage module 102 is takes as a new synthesized range.

Figure 10:
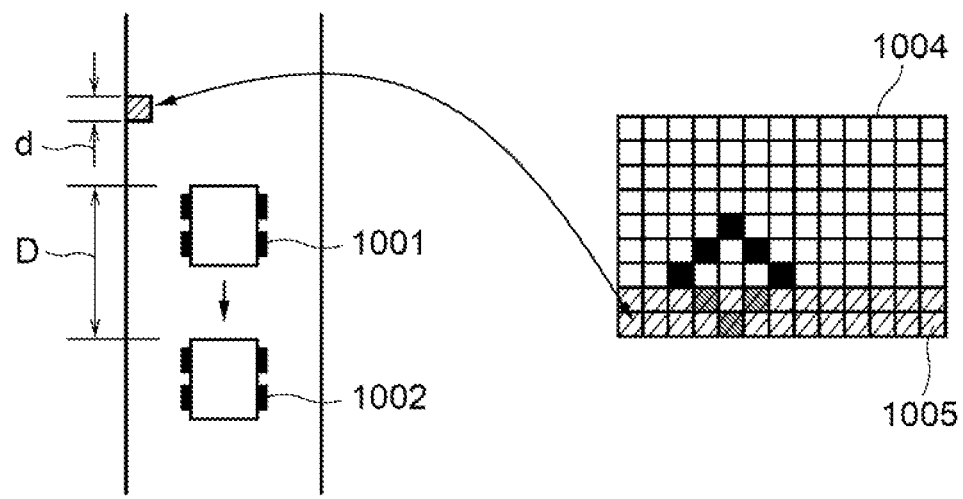
FIG. 10 is an illustration for describing an example of the new synthesized range according to the exemplary embodiment disclosed in FIG. 1 in association with a movement amount of a vehicle.

Now, a method for identifying the new synthesized range by the new synthesized range identifying module 104 will be described by referring to FIG. 10. FIG. 10 is a plan view of the vehicle equipped with the imaging module 101 viewed from the above.

It is assumed that the movement amount from a vehicle position 1001 at the previous image capturing time to a vehicle position 1002 at the current image capturing time when the synthesized bird's-eye image 1004 is created is D. In this case, assuming that a single pixel of the synthesized bird's-eye image corresponds to a length d in the vehicle traveling direction on the road surface, a region 1005 of [D/d] pixel in the longitudinal direction within the synthesized bird's-eye image 1004 or the bird's-eye image according to the road image at the current image capturing time is ought to be captured in the road image at the time of current image capturing as a newly appeared region, so that the road surface range corresponding to that region is specified as a new synthesized range. Note here that [a] is a numerical expression showing the maximum integer of the value a or smaller, and [D/d] shows the maximum integer that does not exceed the value of D/d.

Further, with the above-described method, every time the new synthesized range is determined, there is generated a synthesized bird's-eye image with the movement amount that is estimated smaller by the value of (D−[D/d]×d). Thus, a remainder $R_{t-1}$ of the movement amount at the previous image capturing time t−1 becomes $R_{t-1}=(D_{t-1}-[D_{t-1}/d]\times d)$ provided that the movement amount from t−2 to t−1 is $D_{t-1}$. At this time, by storing $R_{t-1}$ in advance, taking $R_{t-1}+D_t$ that is the sum $R_{t-1}$ and the movement amount $D_t$ from the previous image capturing time t−1 to the current image capturing time t as a corrected movement amount, and setting the region of $[(R_{t-1}+D_t)/d]$ pixel corresponding to that movement amount as a new synthesized range, the accuracy can be improved further. In this case, the remainder $R_t$ of the movement amount is updated with $R_t=(D_t-[(R_{t-1}+D)/d]\times d)$.

Figure 8:
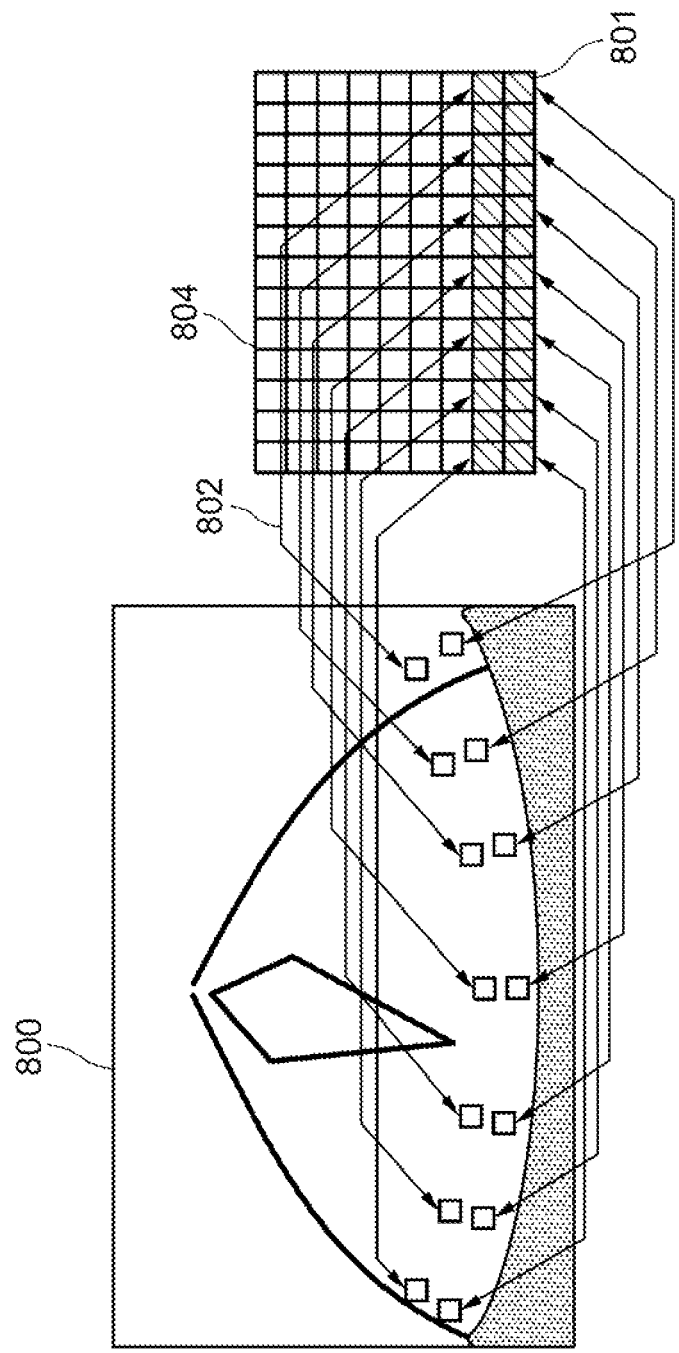
FIG. 8 is an explanatory illustration showing an example of a corresponding relationship between pixels in a road image and pixels in a bird's-eye image according to the exemplary embodiment disclosed in FIG. 1.

The bird's-eye image creating module 105 creates a bird's-eye image of the new synthesized range identified by the new synthesized range identifying module 104. For example, as shown in FIG. 8, a one-on-one corresponding relationship 802 of the pixels within a road image 800 acquired from the imaging module 101 and the corresponding pixels within a created bird's-eye image 804 is set in advance based on the camera parameter information, and the pixel values of the corresponding pixels within the road image 800 are copied to create the bird's-eye image 804. Further, it is also possible to employ a structure with which the road image is converted as it is to a bird's-eye image, and only the image region corresponding to the new synthesized range is cut out from the bird's-eye image.

The image synthesizing module 106 creates a new synthesized bird's-eye image by connecting the bird's-eye image outputted from the bird's-eye image creating module 105 according to new imaging capturing done by the imaging module 101 to the side closer to the own vehicle of the synthesized bird's-eye image which is created from the images up to the previously captured one and already stored in the image storage module 102, and outputs the created new synthesized bird's-eye image to the image storage module 102. Specifically, the synthesized bird's-eye image created from the images up to the previously capture one is shifted by the pixel corresponding to the new synthesized range identified by the new synthesized range identifying module 104, and the bird's-eye image created by the bird's-eye image creating module 105 is copied to the vacant region to create a new synthesized bird's-eye image. Since the bird's-eye image creating module 105 constantly creates the bird's-eye image with the new synthesized range, there is no overlapped region in both images to be connected. Thus, it is unnecessary to execute processing for aligning the positions of the corresponding points, thereby lightening the processing load.

The image synthesizing module 106 may extend the size of the synthesized bird's-eye image every time the images are synthesized or may set a specific range closer to the imaging module 101 as the size of the synthesized bird's-eye image at all times. Specifically, it may be designed to set the size of the image showing the road surface region of only a specific range that is set as a range covering an area of 10 m in the rear direction from a reference point (the position of the vehicle, i.e., the position of the imaging module 101) for the depth direction and an area of 2 m in the left and right directions with respect to the reference point for the lateral direction as the size of the synthesized bird's-eye image.

The road marking recognition module 107 recognizes the road markings such as white lines, arrows, highest speed signs, and pedestrian crossings from the synthesized bird's-eye images stored in the image storage module 102, and outputs the recognition result. The white line recognition processing is executed by a conventional method such as a straight-line detection using Hough transformation, while recognition of the road markings such as the arrows, the highest speed signs, and the pedestrian crossings is achieved by a pattern matching method.

Note here that the functional contents of the new synthesized range identifying module 104, the bird's-eye image creating module 105, the image synthesizing module 106, and the road marking recognition module 107 of the exemplary embodiment may be formed to into a program to have it executed by a computer.

Next, actions of the road marking image processing device of the first exemplary embodiment will be described. The following explanations of the actions illustrate an exemplary embodiment of the road marking image processing method according to the present invention, showing each step of the road marking image processing method along the descriptions of the corresponding actions.

Figure 11:
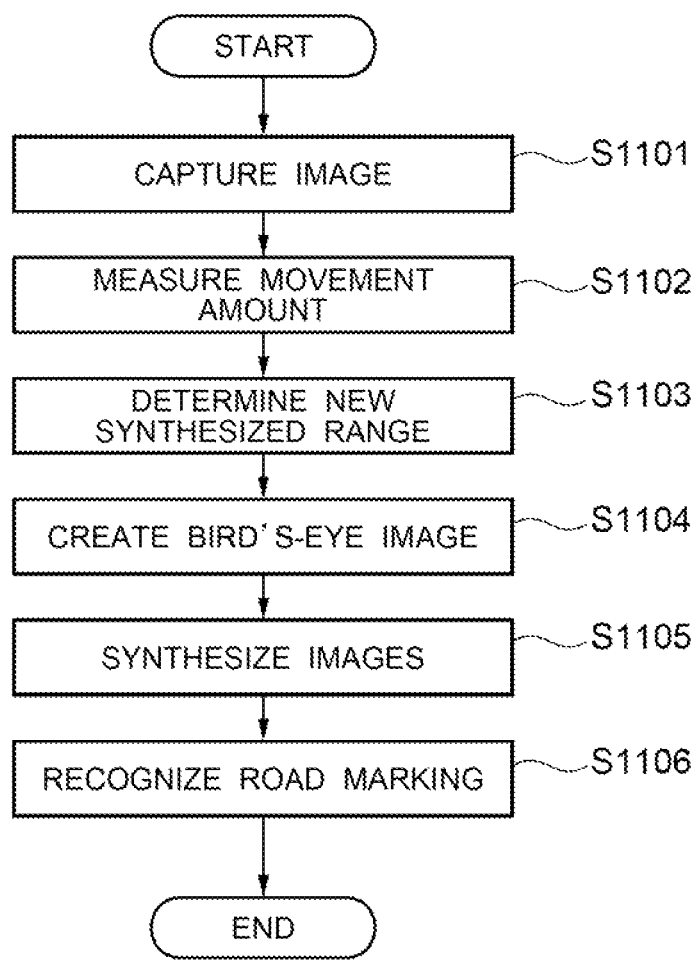
FIG. 11 is a flowchart showing actions of the exemplary embodiment disclosed in FIG. 1.

FIG. 11 is a flowchart showing the actions of the first exemplary embodiment. First, the imaging module 101 placed downwards obliquely at the rear section of the vehicle acquires a road image (step S1101 of FIG. 11, an image capturing step). Subsequently, the movement amount measuring module 103 measures the movement amount of the vehicle (step S1102 of FIG. 11, a movement amount measuring step). The new synthesized range identifying module 104 calculates a new synthesized range of the road image based on the measured movement amount (step S1103 of FIG. 11, a new synthesized range identifying step). The bird's-eye image creating module 105 creates a bird's-eye image which corresponds to the new synthesized range calculated by the new synthesized range identifying module 104 (step S1104 of FIG. 11, a bird's-eye image creating step).

The image synthesizing module 106 shifts the synthesized bird's-eye image which is created from the images up to the previously captured one and already stored in the image storage module 102 by the pixels of the new synthesized range calculated by the new synthesized range module 104, creates a new synthesized bird's-eye image by connecting the bird's-eye image created by the bird's-eye image creating module 105 to the bottom section thereof (an image updating step, an image synthesizing step), and saves the new synthesized bird's-eye image to the image storage module 102 (step S1105 of FIG. 11, an image storing step). Then, the road marking recognition module 107 recognizes a road marking from the synthesized bird's-eye image that is stored in the image storage module 102 (step S1106 of FIG. 16, a road marking recognition step).

In the above explanations of the actions, a case of executing image capturing (step S1101 of FIG. 11), measurement of the movement amount (step S1102 of FIG. 11), and determination of the new synthesized range (step S1103 of FIG. 11) in this order has been described. However, the image capturing may be performed immediately after the measurement of the movement amount or immediately after the determination of the new synthesized range. Further, it is also possible to convert the image including a range that is not actually necessary into a bird's-eye image before identifying the new synthesized range, and cut out only an image region corresponding to the new synthesized image range from the bird's-eye image to connect it to the previously created synthesized bird's-eye image.

Figure 12A:
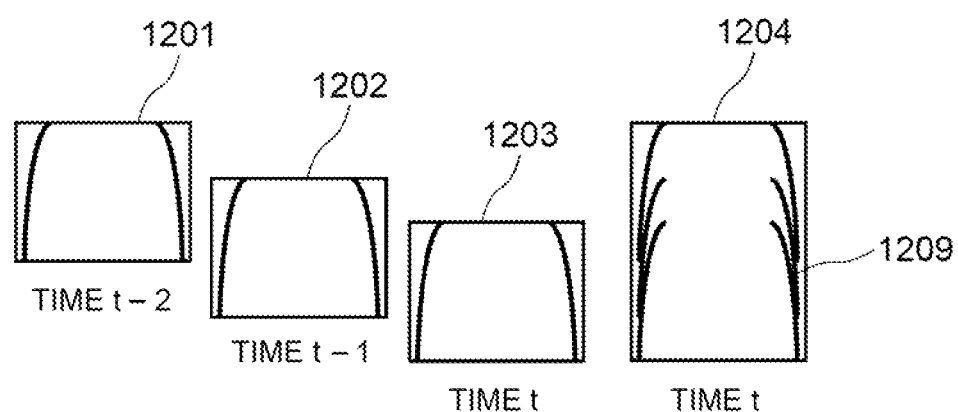
FIG. 12A shows an illustration of a synthesized bird's-eye image acquired according to a conventional method where swollen white lines are created because the positions of white lines of each image do not match with each other due to influence of the camera parameter error when a plurality of bird's-eye images are synthesized.
Figure 12B:
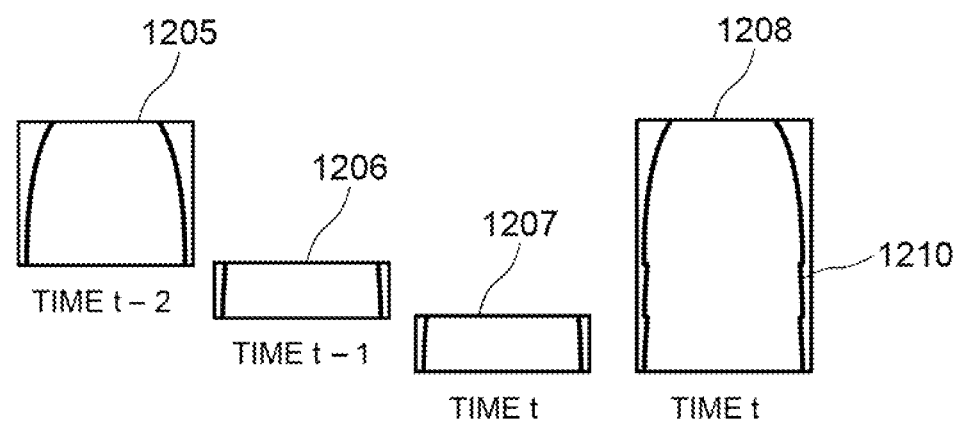
FIG. 12B shows an illustration of a synthesized bird's-eye image acquired according to an embodiment of the present invention where the white lines can be formed in the image more precisely.

As described, in the first exemplary embodiment, the bird's-eye images are created only from the road image of the new synthesized range described above, and the bird's-eye images are connected in the captured order to create the synthesized bird's-eye image. Since the new synthesized range within the image is a range on the side closer to the imaging module 101, the bird's-eye image of the new synthesized range becomes an image with only a small influence of the camera parameter error, headlight of a following car, and the like. Thus, through connecting such images, a high-quality synthesized bird's-eye image can be created. For example, in a case where a conventional method is used, as shown in FIG. 12A, an image-synthesized bird's-eye image 1204 with swollen white lines 1209 is created because the positions of white lines of each image do not match with each other due to the influence of the camera parameter error when bird's-eye images 1201-1203 of the time t−2 to the time t are synthesized. However, with the first exemplary embodiment, as shown in FIG. 12B, a synthesized bird's-eye image 1208 is created from bird's-eye images 1205-1207 of the new synthesized ranges of the time t−2 to the time t, and white lines 1210 can be formed in the image more precisely.

Further, in a case where only the new synthesized range of the road image acquired from the imaging module 101 is converted into a bird's-eye image, the image size to be converted may be extremely small. Furthermore, since there is no overlapped section in the images to be connected, it is unnecessary to synthesize the images by considering the difference between the values of the corresponding pixels, etc. Therefore, it is possible to create the synthesized bird's-eye image promptly.

Second Exemplary Embodiment

Next, a second exemplary embodiment according to the invention will be described.

Figure 13:
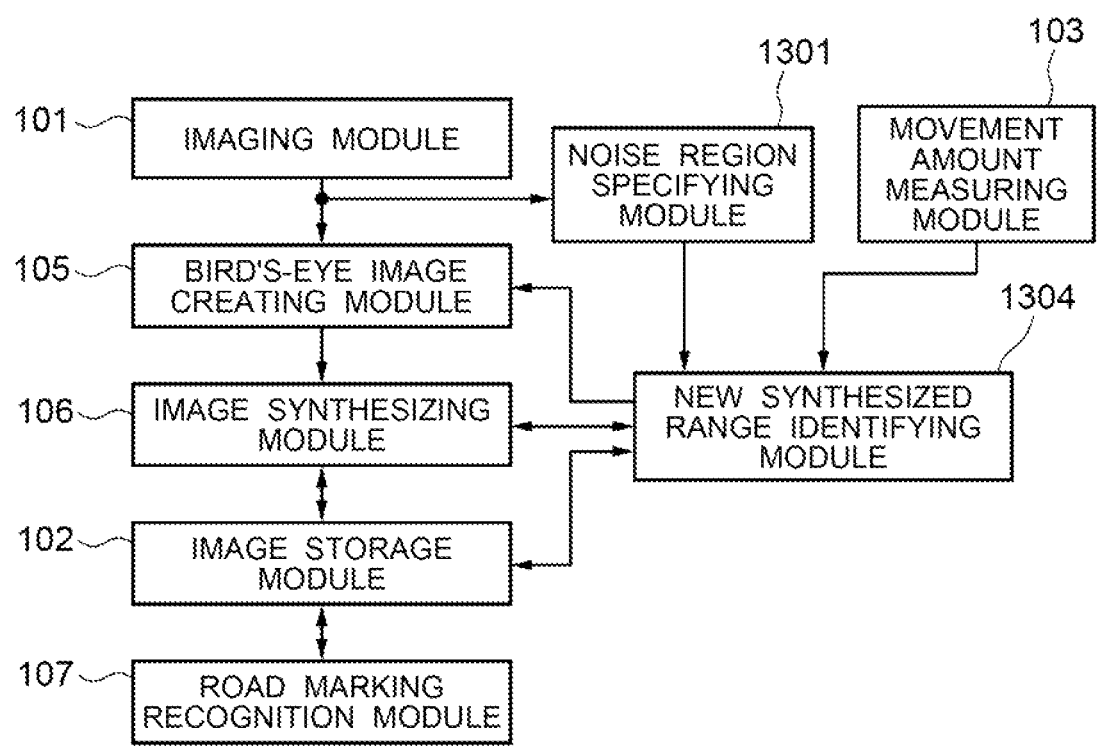
FIG. 13 is a block diagram showing the structure of a road marking image processing device according to a second exemplary embodiment of the invention.

FIG. 13 is a block diagram showing the structure of a road marking image processing device of the second exemplary embodiment. In FIG. 13, same reference numerals are applied to the structural elements that are the same as those of the road marking image processing device of the first exemplary embodiment disclosed in FIG. 1.

As shown in FIG. 13, as in the case of the above-described road marking image processing device of the first exemplary embodiment, the road marking image processing device of the second exemplary embodiment includes: an imaging module 101; an image storage module 102; a movement amount measuring module 103; a bird's-eye image creating module 105; and an image synthesizing module 106. Further, the road marking image processing device of the second exemplary embodiment includes: a noise region specifying module 1301 which judges presence of noise within a road image acquired by the imaging module 101 based on presence of changes in the image, and specifies a noise region when judged that there is a noise; and a new synthesized range identifying module 1304 which identifies a new synthesized range that is a newly acquired range among the road surface range contained in the road image by avoiding the noise region based on the movement amount measured by the movement amount measuring module 103.

The noise region specifying module 1301 detects lens adhesion noises such as mud stains and raindrops as well as noises generated by road surface reflected light such as reflection of street light and captured image of the shadow of the own vehicle from the road image acquired from the imaging module 101. Detections of each noise are done in a following manner, for example.

When dirt is attached to the lens of the imaging module 101, the pixel values at the same pixel positions within the road image remain as low luminance and exhibit almost no change even when the vehicle makes a move. Thus, the image region where the luminance value stays low and exhibits almost no change is judged as a noise generated due to the dirt attached to the lens, and the image region is identified as a noise region.

Figure 4:
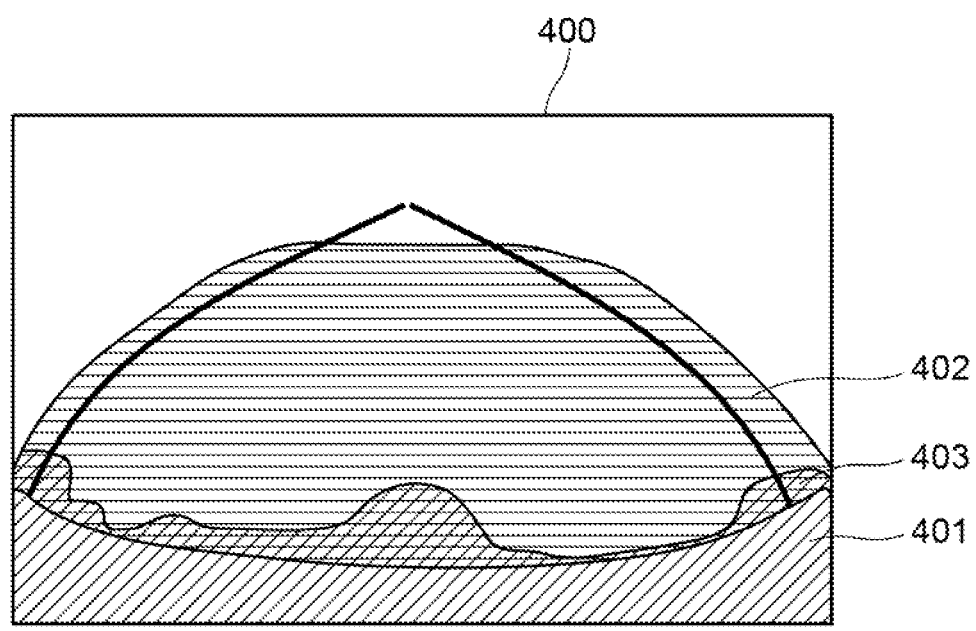
FIG. 4 is an illustration showing an example of a road image with a raindrop that is attached to a lens bottom section.

Further, a raindrop as the factor for deteriorating the quality of the synthesized bird's-eye image attach to the bottom section of the lens of the imaging module 101, which forms a raindrop region 403 that is an overlapped section of a raindrop 401 and a range 402 that is converted into a bird's-eye image within a road image 400 as shown in FIG. 4. The raindrop region 403 is observed as a white region of an extremely high luminance, so that the bottom region where the pixel values stay as being high luminance and exhibit no change even when the vehicle makes a move is identified as a noise region generated due to the raindrop.

The road surface reflected light such as the reflection of the street light is often observed within an image as a high-luminance circular region, and it exhibits such a characteristic that the positional change amount on the image is small with respect to the movement amount of the vehicle. Thus, after extracting the high-luminance circular regions from the road images captured at night, the region whose positional change amount on the image is smaller with respect to the movement amount of the ground object on the image estimated from the movement amount of the vehicle is judged as a noise that is caused by the reflection light from the road surface among the circular regions extracted from the road images at continuous time series, and the image region is identified as a noise region.

Figure 5:
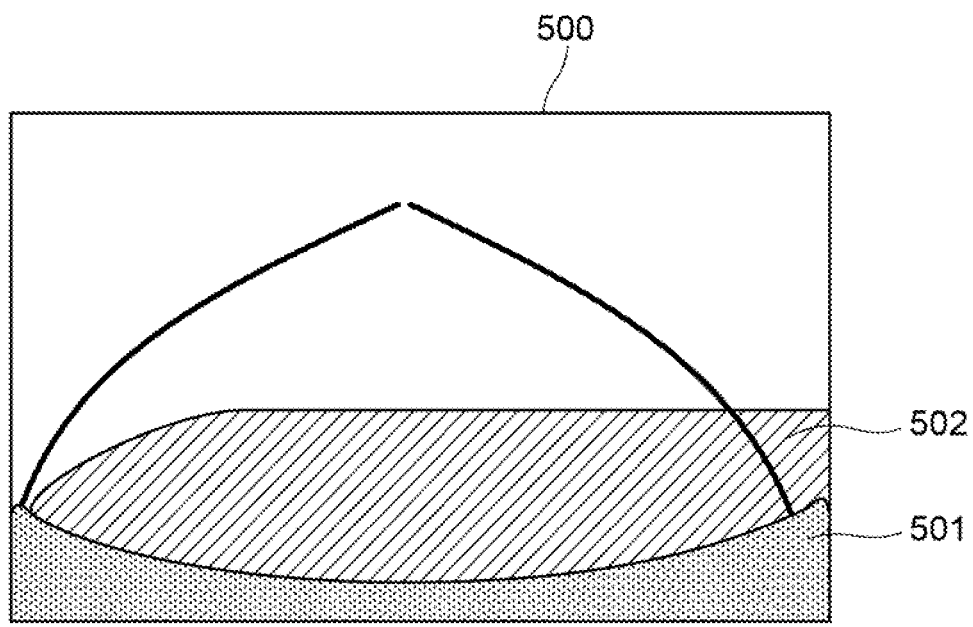
FIG. 5 is an illustration showing an example of a road image with a shadow of an own vehicle.

As shown in FIG. 5, the shadow of the own vehicle is observed as a low-luminance region 502 in the vicinity of a vehicle rear part 501 within a road image 500. Thus, the region 502 whose luminance is largely deteriorated from the top to the lower direction within the road image 500 is extracted. When the positional change thereof is smaller with respect to the movement amount of the ground object on the image estimated from the movement amount of the vehicle, it is judged that there is a noise generated due to the shadow of the own vehicle, and the region 502 on the lower side than the section where the luminance is largely deteriorated is identified as a noise region generated due to the shadow of the own vehicle.

The new synthesized range identifying module 1304 identifies a road surface range which is not contained in the synthesized bird's-eye image created from the images up to the one captured previously and a road surface range which is contained in the road image of the current image capturing time and which is other than the noise region as a new synthesized range. A method for setting the new synthesized range that does not contain the noise region will be described by referring to FIG. 14.

Figure 14A:
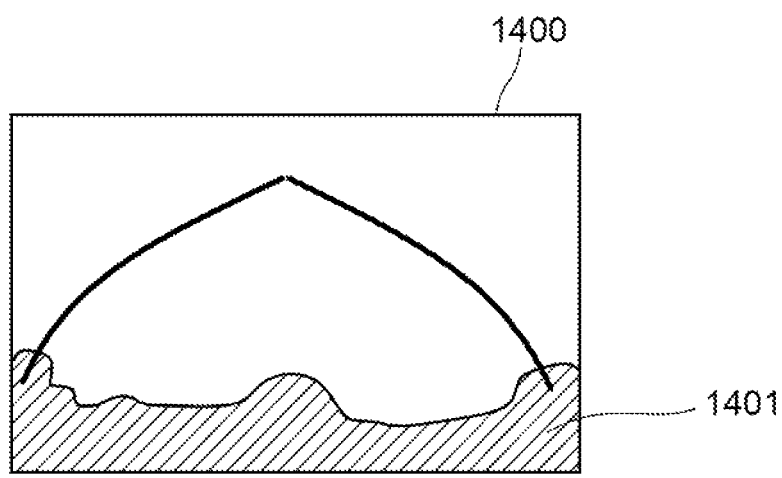
FIG. 14A shows illustrations for describing a method for setting a new synthesized range when there is a noise region generated by a raindrop within a road image.
Figure 14B:
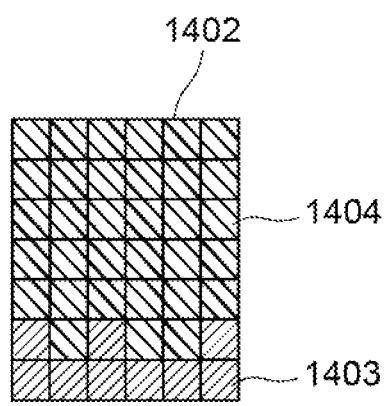
FIG. 14B shows an illustration that shows that the values of the pixels within an image region corresponding to the noise region are uncertain and values of the pixels within a region are settled in a synthesized bird's-eye image created from the images up to the one captured previously.
Figure 14C:
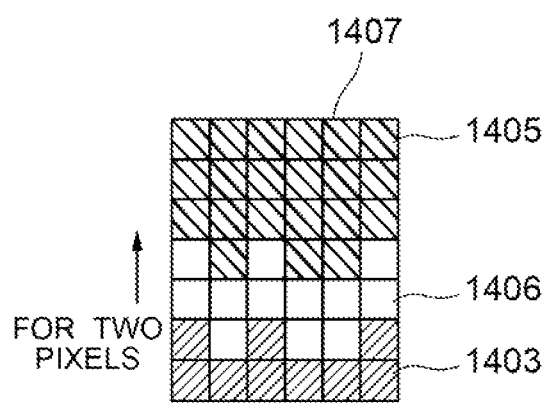
FIG. 14C shows an illustration for describing a case where a new synthesized range is set when there is a noise region.

FIGS. 14A, 14B, and 14C show illustrations for describing the method for setting the new synthesized range when there is a noise region 1401 generated by a raindrop within a road image 1400 shown in FIG. 14A. In a synthesized bird's-eye image 1402 created from the images up to the one captured previously, the values of the pixels within an image region 1403 corresponding to the noise region 1401 are uncertain, and values of the pixels within a region 1404 are settled.

In the new synthesized range determining processing, the new synthesized range identifying module 1304 of the second exemplary embodiment takes the pixels whose values are unspecified in the synthesized bird's-eye image as a region that is not contained in the previously created bird's-eye image. Further, provided that the synthesized bird's-eye image corresponds to a road surface range of a specific distance from the imaging module 101 at the time of image capturing, the region 1404 within the synthesized bird's-eye image 1402 that is created from the images up to the one captured preciously becomes a region 1405 that is shifted by two pixels upwards within a synthesized bird's-eye image 1407 that is created with the current image capturing shown in FIG. 14C in a case where the movement amount of the vehicle from the previous image capturing time to the current image capturing time corresponds to two pixels within the synthesized bird's-eye image, and the pixels in the regions 1403 and 1406 become the regions that are not contained in the synthesized bird's-eye image 1402 of the previously captured images. However, the region 1403 is a noise region, so that the region 1406 is set as a new synthesized range.

Figure 15:
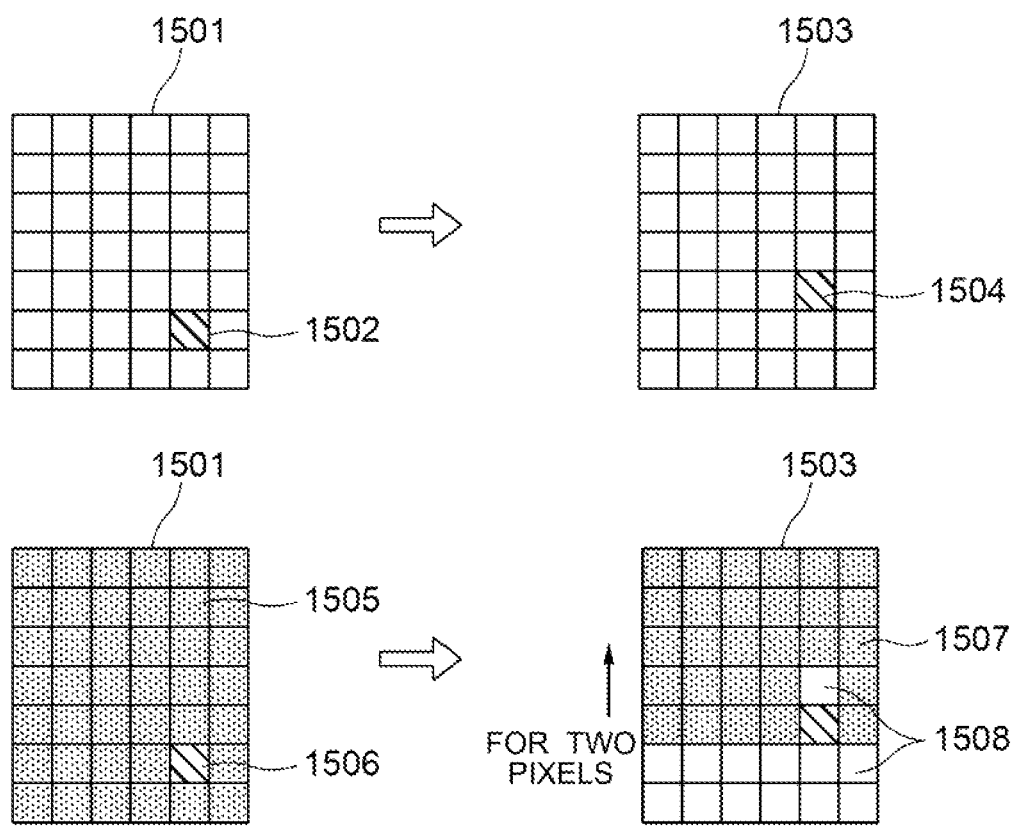
FIG. 15 is an illustration for describing an example of creating a synthesized bird's-eye image according to the exemplary embodiment disclosed in FIG. 13.

Further, by referring to FIG. 15, a case where the position of the noise region slightly changes like the road surface reflection of the street light will be described. Described is an example of the case where a noise region 1502 within a bird's-eye image 1501 at the previous image capturing moves to a noise region 1504 in a bird's-eye image 1503 at the current image capturing.

At this time, the pixel value of a pixel 1506 corresponding to the noise region generated due to the road surface reflected light is not settled in the bird's-eye image 1501 created from the images up to the one captured previously. If the movement amount of the vehicle corresponds to exactly two pixels of the synthesized bird's-eye image, a pixel region 1505 with a settled pixel value within the bird's-eye image 1501 created from the images up to the one captured previously becomes a range 1507 within the bird's-eye image 1503 at the current image capturing. Thus, a region 1508 is taken as a new synthesized range at the current image capturing.

Next, actions of the second exemplary embodiment will be described by referring to the drawings. The following explanations of the actions illustrate an exemplary embodiment of the road marking image processing method according to the present invention, showing each step of the road marking image processing method along the descriptions of the corresponding actions.

Figure 16:
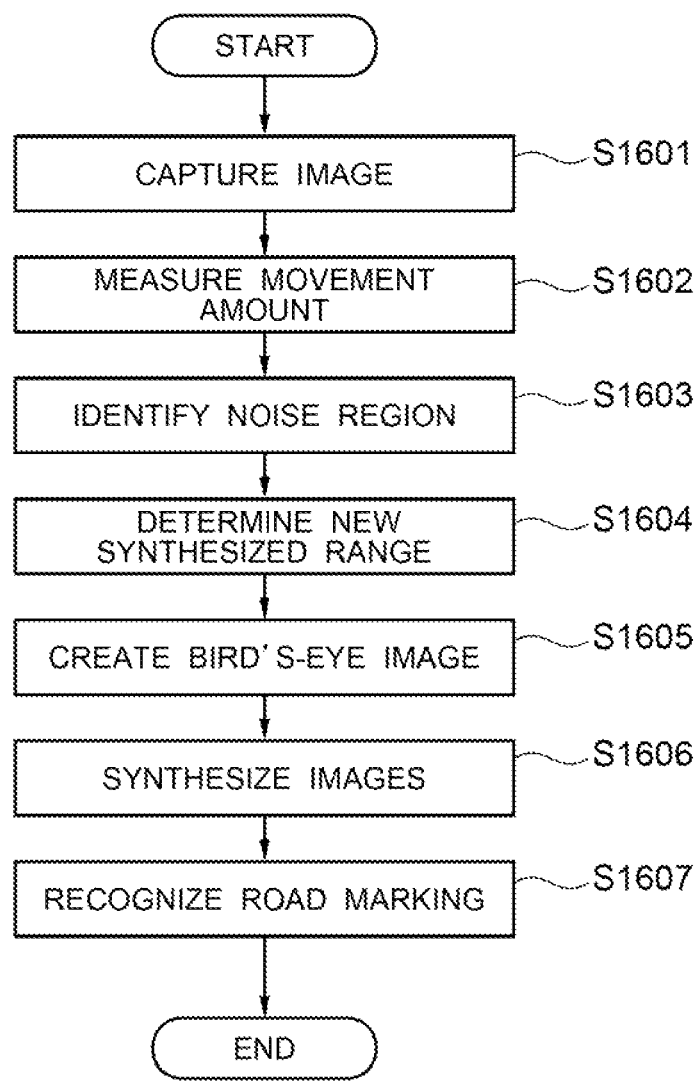
FIG. 16 is a flowchart showing actions of the exemplary embodiment disclosed in FIG. 13.

FIG. 16 is a flowchart showing the actions of the road marking image processing device of the second exemplary embodiment. First, the imaging module 101 placed downwards obliquely at the rear section of the vehicle acquires a road image (step S1601 of FIG. 16, an image capturing step). Subsequently, the movement amount measuring module 103 measures the movement amount of the vehicle (step S1602 of FIG. 16, a movement amount measuring step). The noise region specifying module 1301 specifies the noise regions among the road images acquired from the imaging module 101, and outputs the positional information thereof (step S1603 of FIG. 16, a noise region specifying step). The new synthesized range identifying module 1304 determines and outputs a new synthesized range based on the movement amount of the vehicle, the previously created synthesized bird's-eye image, and the positional information of the noise regions (step S1604 of FIG. 16, a new synthesized range identifying step).

Then, the bird's-eye image creating module 105 creates a bird's-eye image which corresponds to the new synthesized range identified by the new synthesized range identifying module 1304 (step S1605 of FIG. 16, a bird's-eye image creating step). The image synthesizing module 106 creates a new synthesized bird's-eye image by connecting the bird's-eye image created by the bird's-eye image creating module 105 to the synthesized bird's-eye image created from the images up to the one captured previously in which the pixels are shifted by the amount of the new synthesized range that is identified by the new synthesized range identifying module 1304 (an image synthesizing step, an image updating step), and saves the new synthesized bird's-eye image to the image storage module 102 (step S1606 of FIG. 16, an image storing step). Then, the road marking recognition module 107 recognizes a road marking from the synthesized bird's-eye image that is stored in the image storage module 102 (step S1607 of FIG. 16, a road marking recognition step).

The explanations of the actions have been made by referring to the case where the new synthesized range identifying module 1304 determines the new synthesized range dynamically by considering the hourly-updated noise region information outputted from the noise region specifying module 1301. However, for the noise factor such as mud or raindrop whose position on the image does not change even after a passage of time, it is also possible to employ a structure in which the noise region specifying module 1301 specifies a noise region sporadically at proper timings, and use the latest extracted noise region information until the next noise region is specified. With this, it becomes unnecessary to operate the noise region specifying module 1301 hourly, and it becomes possible to create a bird's-eye image promptly even when the processing time of the noise region specifying module 1301 is extensive.

Further, when it is obvious in advance that a noise is captured in a specific region with a high probability, the new synthesized range identifying module 1304 may set in advance a closed region by avoiding the region that is highly possible to have a noise captured therein, and specify a new synthesized range within the closed region. For example, as shown in FIG. 17A, it is highly possible that a raindrop 1701 is captured into a lens bottom section within a road image 1700 on a rainy day. Thus, a closed region 1702 may be set at the time of startup in regions where raindrops are hardly captured, and the new synthesized range identifying module 1304 may identify a new synthesized range from the closed region 1702 that is set within a road image 1700 shown in FIG. 17A or within a bird's-eye image 1703 shown in FIG. 17B.

As described, in a case where there are the lens extraneous maters, shadow of the own vehicle, the road surface reflected light, or the like captured within a captured road image, those captured images are judged as noises in the second exemplary embodiment, the positions thereof are identified as the noise regions, and a bird's-eye image is created from the image region from which the noise regions are avoided. Thus, it is possible to obtain a synthesized bird's-eye image which does not contain such noise factors. This makes it possible to execute the processing for recognizing the road making from the synthesized bird's-eye image with high accuracy.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

The invention claimed is:

1. A road marking image processing method for recognizing a road marking within a captured image of a road surface, comprising:
   capturing a road image of a rear side of a traveling path from a vehicle;
   measuring a movement amount of the vehicle;
   identifying a road surface range corresponding to the movement amount as a new synthesized range from the road image, and creating a bird's-eye image for the new synthesized range; and
   shifting position of a synthesized bird's-eye image that is being stored by length corresponding to the movement amount, synthesizing the synthesized bird's-eye image to the bird's-eye image created for the new synthesized range to create a new synthesized bird's-eye image, and outputting the created new synthesized bird's-eye image.

2. The road marking image processing method as claimed in claim 1, comprising:
   judging presence of a noise within the road image based on presence of a change in the image, and specifying a noise region when judged that there is a noise; and
   identifying the road surface range by avoiding the specified noise region when identifying the road surface range.

3. The road marking image processing method as claimed in claim 2, comprising identifying the road surface range within a closed region that is set in advance within an image region of the road image when identifying the road surface range.

4. The road marking image processing method as claimed in claim 1, comprising recognizing a road marking within the synthesized bird's-eye image.

5. A non-transitory computer readable recording medium storing a road marking image processing program for recognizing a road marking within a captured image of a road surface, which causes a computer to execute:
   a function which acquires a road image from an imaging module which is loaded on a vehicle to capture the road image of a rear side of a traveling path;
   a function which acquires a movement amount value of the vehicle;
   a function which identifies a road surface range corresponding to the movement amount as a new synthesized range from the road image, and creates a bird's-eye image for the new synthesized range; and
   a function which shifts position of a synthesized bird's-eye image that is being stored by length corresponding to the movement amount, and synthesizes the synthesized bird's-eye image to the bird's-eye image created for the new synthesized range to create a new synthesized bird's-eye image.

6. The non-transitory computer readable recording medium storing the road marking image processing program as claimed in claim 5, which causes the computer to execute:
   a function which judges presence of a noise within the road image based on presence of a change in the image, and specifies a noise region when judged that there is a noise; and
   a function which identifies the road surface range by avoiding the specified noise region.

7. The non-transitory computer readable recording medium storing the road marking image processing program as claimed in claim 6, which causes the computer to execute a function which identifies the road surface range within a closed region that is set in advance within an image region of the road image.

8. The non-transitory computer readable recording medium storing the road marking image processing program as claimed in claim 5, which causes the computer to execute a function which recognizes a road marking within the synthesized bird's-eye image.

9. A road marking image processing device which recognizes a road marking within a captured image of a road surface, comprising:
   an imaging device configured for placement on a vehicle and configured to capture a road image of a rear side of a traveling path of the vehicle;
   a sensor configured to measure a movement amount of the vehicle along the traveling path;
   a memory configured to store a synthesized bird's-eye image; and
   a processor configured to perform operations of:
      identifying a road surface range corresponding to the movement amount of the vehicle as a new synthesized range from the road image;
      creating a bird's-eye image for the new synthesized range;
      shifting a position of the synthesized bird's-eye image by a length corresponding to the movement amount of the vehicle;
      synthesizing the synthesized bird's-eye image to the bird's-eye image created for the new synthesized range to create a new synthesized bird's-eye image, and outputting the created new synthesized bird's-eye image;
      recognizing a road marking based on the new synthesized bird's-eye image; and
      outputting a result of the recognized road marking based on the new synthesized bird's-eye image.

10. The road marking image processing device as claimed in claim 9, comprising a noise region specifying module implemented by the processor which judges presence of a noise within the road image based on presence of a change in the image, and specifies a noise region when judged that there is a noise, wherein the road surface range is identified by avoiding the noise region that is specified by the noise region specifying module.

11. The road marking image processing device as claimed in claim 10, wherein the noise region specifying module judges an image region with no luminance change within the road image as having a noise that is generated due to an extraneous matter attached to a lens of the imaging module.

12. The road marking image processing device as claimed in claim 10, wherein the noise region specifying module judges an image region whose positional change is smaller than other regions in a circular high-luminance region within the road image as a noise that is generated due to reflected light from the road surface captured into the image.

13. The road marking image processing device as claimed in claim 10 wherein the noise region specifying module judges an image region whose positional change is smaller than other regions in a low-luminance region located on the vehicle side within the road image as a noise that is generated due to a shadow of the vehicle captured into the image.

14. The road marking image processing device as claimed in claim 10, wherein the new synthesized range identifying module identifies the road surface range within a closed region that is set in advance within an image region of the road image.

\* \* \* \* \*